United States Patent [19]
Tinsley

[11] 3,845,824
[45] Nov. 5, 1974

[54] FRACTURING SUBTERRANEAN FORMATIONS WITHOUT DAMAGING THE FORMATION

[75] Inventor: John M. Tinsley, Duncan, Okla.

[73] Assignee: Halliburton Company, Duncan, Okla.

[22] Filed: June 25, 1973

[21] Appl. No.: 373,579

[52] U.S. Cl. ............................................. 166/308
[51] Int. Cl. ........................................... E21b 43/26
[58] Field of Search ........... 166/308, 271, 280, 281, 166/282, 283; 252/8.55 R

[56] References Cited
UNITED STATES PATENTS

| | | | |
|---|---|---|---|
| 3,374,835 | 3/1968 | Knox | 166/282 |
| 3,378,073 | 4/1968 | Savins | 166/308 |
| 3,397,744 | 8/1968 | Hort et al. | 166/308 |
| 3,417,820 | 12/1968 | Epler et al. | 166/308 |
| 3,481,400 | 12/1969 | Kerver et al. | 166/308 X |
| 3,500,932 | 3/1970 | Webb | 166/308 |
| 3,727,688 | 4/1973 | Clampitt | 166/308 X |
| 3,752,233 | 8/1973 | Svaldi et al. | 166/308 |

*Primary Examiner*—Stephen J. Novosad
*Attorney, Agent, or Firm*—Fred E. Hook; John H. Tregoning; Thomas R. Weaver

[57] ABSTRACT

A subterranean formation is fractured by a method whereby anionic surface active agents, low molecular weight anionic polyelectrolytes or mixtures thereof are adsorbed on the organic polymer attracting sites in the formation adjacent to the faces of the fracture extending into the subterranean formation. These anionic surface active agents, low molecular weight anionic polyelectrolytes desorb and are removed from the formation in the produced fluids.

5 Claims, No Drawings

FRACTURING SUBTERRANEAN FORMATIONS WITHOUT DAMAGING THE FORMATION

Hydraulic fracturing is widely used to stimulate production from oil and gas wells completed in low permeability formations, and many methods and compositions for hydraulically fracturing subterranean well formations penetrated by a well bore have been developed.

Commonly, a fracturing fluid is pumped through the tubing or casing disposed in the well bore into the formation sought to be fractured. The fracturing fluid is pumped at a rate sufficient to open a fracture in the exposed formation, and to extend the fracture from the well bore into the formation. Continued pumping of said fracturing fluid containing a propping agent into said fracture results in proppant placement within the fractured zone. Following the treatment, the fracturing fluid is recovered from the well, leaving the proppant remaining in the fracture, thereby preventing the complete closure thereof and forming a permeable channel extending from the well bore into the formation.

The conductivity of the propped fracture depends, among other things, on the size of the propping agent particles placed in the fracture. This, in turn, depends upon the width to which the particular fracture may be opened during injection of the fracturing fluid. The production of wide fractures normally require that the fracturing fluids have high viscosities. The use of fracturing fluids having high viscosities is advantageous since such fluids can support the propping agent particles suspended therein without excessive settling. Also, relatively large size propping agent particles can be placed in the formation using high viscosity fracturing fluids since wider fractures generally result, reducing the possibility of the propping agent bridging across the mouth of the fracture and accumulating in the well bore, a condition commonly referred to as "screen-out."

The viscosity of an aqueous fracturing fluid is generally increased by the use of an organic polymer gelling agent. Examples of useful organic polymer gelling agents are the hydratable polysaccharides such as guar gum, karaya gum, locust bean gum, hydroxyethylcellulose, carboxymethylhydroxy-ethylcellulose, and carboxymethylcellulose and the synthetic polymers such as polyacrylamide and polyacrylate.

These organic polymers have an affinity for attraction sites in the subterranean formation and may cause formation damage when the gelled fracturing fluid is forced into the formation adjacent to the face of the fracture extending into the subterranean formation. These gelling agents are adsorbed in the formation and restrict the flow of production fluid into the fracture.

By this invention, a method of fracturing a subterranean formation is provided in which the subterranean formation is first fractured with an aqueous liquid containing a material which will adsorb to the organic polymer attracting sites in the formation adjacent to the face of the fracture. This material occupies the organic polymer attracting sites while the gelled fracturing fluid is in the formation adjacent to the face of the fracture; thus, the gelled fracturing fluid is removed from the subterranean formation when the formation fluids are produced. This material has the additional property of being desorbed as the formation fluids are being produced, leaving the interconnecting pore spaces in the formation adjacent to the face of the fracture free from material which could restrict the flow of formation fluids into the fracture.

Materials which have been found to adsorb on organic polymer attracting sites in subterranean formations are anionic surface active agents, low molecular weight anionic polyelectrolytes, or mixtures thereof. These materials are also desorbed as the formation fluids are produced. Suitable anionic surface active agents include but are not limited to the alkyl aryl sulfonates, alkyl napthalene sulfonates, aliphatic sulfonates and alicyclic sulfonates. The alkyl, aliphatic and alicyclic chain length has been found to be important for imparting surface active characteristics to the compound. An alkyl alicyclic or aliphatic chain length of four to 20 carbon atoms is generally satisfactory; however, an alkyl alicyclic or aliphatic chain length of eight to 18 carbon atoms is preferred.

Suitable low molecular weight anionic polyelectrolytes include but are not limited to polyacrylic acid, polymethacrylic acid, the polyarylates, the polymethacrylates, partially hydrolyzed polyacrylamide, polyvinyl alcohol, polyvinylpyrrolidone, copolymers or maleic anhydride and the acrylate monomers, and mixtures thereof. These polymers should have molecular weights significantly lower than the molecular weights of the organic polymer gelling agents used in the aqueous fracturing fluid. The molecular weight of these polymers should be less than about 10,000 and preferably less than about 5,000.

The design of a fracturing treatment with these materials involves the characteristics of the subterranean formation to be fractured, the geometry of the fracture to be formed and the fluid loss characteristics of the fracturing fluid. Core samples from the subterranean formation should be analyzed to determine the number of organic polymer attracting sites in the formation. The fracture geometry needs to be determined to give an estimate of the surface area of the subterranean formation which will be contacted.

The fluid loss characteristics of the fracturing fluid needs to be determined to evaluate the extent to which the gelled fracturing fluid will penetrate the subterranean formation adjacent to the face of the fracture.

The proper treatment of the subterranean formation adjacent to the face of the fracture can require that as much as 25 percent of the total volume of fluids used in the fracturing treatment contain these materials. These materials should be included in the aqueous liquid, which precedes the aqueous gelled fracturing fluid into the fracture extending into the subterranean formation, at about 0.5 to 5 and preferably one to three parts by weight of the material per 100 parts by weight of the aqueous liquid. The maximum concentration is the concentration above which additional benefit will not be obtained.

The invention will be further described with reference to the following Examples which are to be considered for illustrative purposes only and not for purposes of limiting the invention.

EXAMPLE I

A low molecular weight anionic polyelectrolyte is evaluated for reducing the permeability damage caused by introducing a fracturing fluid gelled with guar gum into a Bandera sandstone core. The low molecular weight anionic polyelectrolyte has a molecular weight of about 1,000 and consists of about 70 parts by weight sodium polyacrylate and 30 parts by weight polyacrylic acid per 100 parts by weight of the polyelectrolyte.

These tests are conducted on a water-wet Bandera sandstone core by first flushing a volume of an aqueous liquid containing the concentration of anionic polyelectrolyte shown on Table I. An aqueous fracturing gel containing 2 parts by weight potassium chloride per 100 parts by weight of the fracturing fluid and 50 pounds of guar gum gelling agent per 1,000 gallons of the fracturing fluid is introduced into the core. The permeability of the core is then determined and compared with the permeability of the core before introducing the aqueous fracturing gel into the core to determine the permeability reduction caused by introducing the fracturing gel into the core.

The data on Table I indicates that the permeability reduction caused by flowing the fracturing fluid gelled with an organic polymer is decreased as the concentration of the anionic polyelectrolyte is increased from 1 to 3 parts by weight polyelectrolyte per 100 parts by weight of the aqueous liquid which is flushed through the core before introducing the aqueous fracturing gel into the core.

TABLE I

| Concentration of Polyelectrolyte in the Aqueous Liquid (Parts by Weight)* | Permeability Reduction (Percent) |
|---|---|
| 0 | 60.60 |
| 1 | 54.50 |
| 2 | 27.17 |
| 3 | 15.77 |

*Parts by weight per 100 parts by weight aqueous liquid.

EXAMPLE II

Tests similar to Example I are conducted in which the same polyacrylic acid ester is added directly to the fracturing fluids. The amount of permeability damage is high for all samples. The utilization of the low molecular weight material in conjunction with the fracturing fluid does not appear to prevent or significantly reduce permeability damage.

It will be apparent that many widely different embodiments of this invention may be made without departing from the spirit and scope thereof, and, therefore, it is not intended to be limited except as indicated in the appended claims.

What is claimed is:

1. A method of fracturing a subterranean formation; comprising the steps of:
    contacting the subterranean formation with an aqueous liquid containing low molecular weight anionic polyelectrolytes;
    applying sufficient pressure to said aqueous liquid to fracture said formation;
    maintaining said pressure while injecting said aqueous fluid into said fracture; and
    maintaining said pressure while injecting an aqueous fracturing fluid containing an organic polymer gelling agent into said fracture to extend said fracture into said formation;
    said low molecular weight anionic polyelectrolytes having molecular weights significantly lower than the molecular weights of said organic polymer gelling agents and adsorbing to the organic polymer attracting sites in the subterranean formation adjacent to the faces of said fracture extending into the subterranean formation.

2. The method of fracturing a subterranean formation as recited in claim 1 wherein said anionic polyelectrolyte has a molecular weight of less than about 10,000 and is selected from the group consisting of polyacrylic acid, polymethacrylic acid, polyacrylate, polymethacrylate, partially hydrolyzed polyacrylamide, polyvinyl alcohol, polyvinyl acetate, polyvinylpyrrolidone and copolymers of maleic anhydride and acrylate monomers.

3. The method of fracturing a subterranean formation as recited in claim 2 wherein said aqueous liquid contains about 0.5 to 5 parts by weight of said anionic polyelectrolytes per 100 parts by weight of said aqueous liquid and, further, wherein the molecular weight of said anionic polyelectrolyte is less than about 5,000.

4. The method of fracturing a subterranean formation as recited in claim 3 wherein said aqueous liquid contains about one to three parts by weight of said anionic polyelectrolyte per 100 parts by weight of said aqueous liquid.

5. The method of fracturing a subterranean formation as recited in claim 4 wherein said anionic polyelectrolyte is a mixture consisting of about 70 parts by weight sodium polyacrylate and about 30 parts by weight polyacrylic acid per 100 parts by weight of the anionic polyelectrolyte mixture, said polymers having molecular weights of about 1,000.

* * * * *